United States Patent Office 3,583,905
Patented June 8, 1971

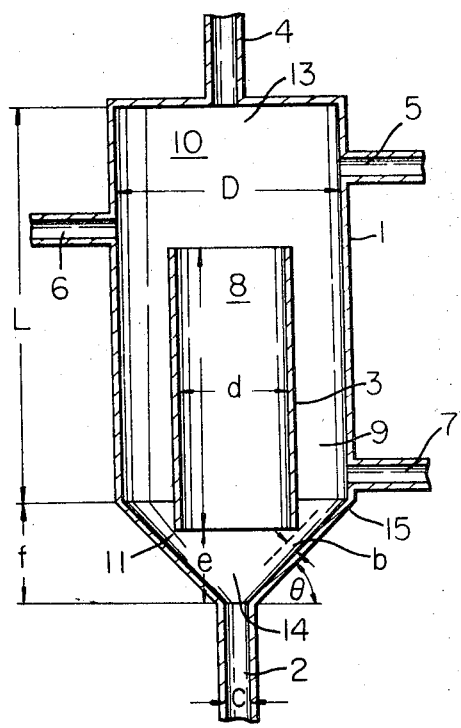

3,583,905
HYDRODESULFURIZATION OF HEAVY PETROLEUM HYDROCARBON OIL IN A FLUIDIZED REACTION ZONE
Yutaka Oguchi and Junichi Kubo, Tokyo, Japan, assignors to Nippon Oil Company, Ltd., Tokyo, Japan
Filed June 10, 1968, Ser. No. 735,733
Claims priority, application Japan, June 12, 1967, 42/37,130
Int. Cl. C10g 23/10
U.S. Cl. 208—213                                6 Claims

ABSTRACT OF THE DISCLOSURE

A process for the hydrodesulfurization of a heavy petroleum hydrocarbon oil is provided, wherein the oil, a hydrodesulfurization catalyst and a hydrogen-containing gas are first passed into a fluidization initiating zone of a hydrodesulfurizing reactor; the mixture is passed upwardly through a fluidized reaction zone wherein hydrodesulfurization of the oil takes place; the reaction product from the fluidized reaction zone including the hydrodesulfurization catalyst is passed into a separating zone of increased cross-sectional area compared to the cross-sectional area of the fluidized reaction zone; the hydrodesulfurized oil is withdrawn from the top of the separating zone while substantially all of the hydrodesulfurization catalyst separates downwardly from the separating zone into a catalyst settling zone due to the increase in the cross-sectional area of the separating zone and the resultant decrease in the flow rate of the oil and gas; and thereafter the hydrodesulfurization catalyst is returned from the catalyst settling zone through the fluidization initiation zone to repeat the foregoing steps.

This invention relates to a process and apparatus for conducting the hydrodesulfurization of heavy petroleum hydrocarbon oil.

The most desirable mode of hydrodesulfurization of heavy oil consists in effecting the contact at elevated temperatures and pressures of a suitable hydrodesulfurization catalyst with the feed stock heavy oil and a gas containing a substantial amount of hydrogen (hereinafter referred to as hydrogen-containing gas). As the hydrodesulfurization catalyst, as here referred to, useable are the sulfur-resistant catalysts such as nickel·molybdenum·catalysts, nickel·cobalt·molybdenum catalysts, cobalt·molybdenum catalysts and nickel·tungsten catalysts which are supported by alumina or silica alumina.

As regards the process for the catalytic hydrodesulfurization petroleum, various refining processes employing a fixed bed or a fluidized bed have been developed and put to practice commercially in the case where distilled oils are used as the feed stock. However, as regards the treatment of heavy petroleum hydrocarbon oil containing asphaltenes, particularly heavy oils, fractions containing the distillation residual oils and crude petroleum oils, the lowering of the catalytic activity due to the asphaltenes and metals in the feed stock was exceedingly great, resulting in a shortening of the catalytic life and hence making the continuous operation over a long period of time difficult. For instance, distillation residual oils, crude petroleum oils and the like contain about 1–15% by weight of asphaltenes, and the asphaltenes tend to cause a separation of carbonaceous materials during the hydrogenation reaction, and the carbonaceous materials deposited on the catalyst surface covered the activity sites to become the cause of a lowering of the catalytic activity. It is also known that the metals present in asphaltenes (principally vanadium and nickel) also become deposited on the surface of the catalyst to become an important cause of the lowering of the catalytic activity. The carbonaceous materials are readily eliminated by burning, and hence if the catalyst whose catalytic activity has been reduced is thus regenerated, it can be used repeatedly. However, in a process employing the fixed bed this is not desirable when the rate of deposition of the carbonaceous materials is fast, since the regeneration operation must be carried out by interrupting operations at short-period cycles. On the other hand, since the catalyst on which metals have been deposited are difficult to regenerate, it must be exchanged for a fresh catalyst after a certain amount of the metals has been deposited. Accordingly, when the rate of deposittion of the metals is fast, not only the operating cycle becomes short, but also the expense of the catalyst becomes costly to result in an economic disadvantage.

In order to promote efficiently the hydrodesulfurization, it is essential that the catalyst, the oil and hydrogen are contacted with each other in the reactor. A preferable contact is obtained by fluidizing the catalyst in the reactor, and a temperature distribution is made more uniform in the reactor, with the consequence that it is possible to conduct the hydrodesulfurization under more preferable conditions. For the purpose of fluidizing the catalyst, reaction is generally conducted in a fluidized or boiling bed.

Again, in the hydrodesulfurization of heavy oil using a fluidized bed, the particles of the catalyst are preferably small, chiefly from the standpoint of increasing the area of contact. When a catalyst of a small size is used in a fluidized state, the separation of the resulting oil and the catalyst particles become difficult.

In the conventional method using the fluidized bed, in order to overcome said defect it may be devised to use a catalyst of a comparatively coarse particle size. In this case, however, there is the shortcoming that the linear velocity each of the gas and oil must be heightened to a certain extent so as to fluidize the catalyst sufficiently and efficiency of the catalyst is lowered.

An object of the present invention therefore resides in improving on these drawbacks to thereby make it possible to carry out the effective hydrodesulfurization of heavy oil while using not only catalysts whose particle size is of the size usually used for the fluidized bed but also those of small particle size.

Further, as previously indicated, in the hydrodesulfurization of heavy oil, the decline in the activity of the catalyst is a serious problem. Even when the hydrodesulfurization is conducted by means of a catalyst in the fluidized state, a part or all of the catalyst must be replaced with either a fresh or regenerated catalyst. This replacement of the catalyst by replenishment with an active catalyst and withdrawal of the catalyst whose activity has declined becomes an important problem from the technical as well as economic standpoint.

Further, in carrying out this replacement of the catalyst by replenishment and withdrawal of the catalysts, the steady state of the inside of the reactor is disrupted to a certain extent in the case of the conventional apparatus which uses the catalyst by fluidizing it.

Another object of the invention is therefore to provide a new process and apparatus for the hydrodesulfurization of heavy oil which makes possible the prolongation of the interval between replacement of the catalyst consisting of replenishment with active catalyst and withdrawal of catalyst whose activity has declined, and in which this operation has been simplified, as well as in which the steady state inside the reactor is not disrupted even during the operation of replacing the catalyst, thus making it possible to continue the reaction effectively and steadily.

On the other hand, there was also the drawback that in using the catalyst in the conventional processes by fluidizing it the linear velocity of the oil and gas had to be raised to at least a certain degree or more for fluidizing the catalyst, and further the inner wall of the reactor was in direct contact with the catalyst particles in a fluidized state, corrosive compounds of such as sulfur and nitrogen were contained in the heavy oil, and contact was had with hydrogen at elevated temperatures and pressures, with the consequence that it was necessary to consider the matter of erosion and erosion-corrosion of the inner wall of the reactor at elevated temperatures and pressures and hence metals of high grade had to be used for preventing erosion and erosion-corrosion of the wall, thus inevitably resulting in the apparatus becoming costly.

Accordingly, a further object of this invention is to provide an apparatus for hydrodesulfurizing heavy oil, which can effectively prevent the erosion and erosion-corrosion of the reactor even when the reactor used is one which is not made of these high grade materials, thus making it possible to use the reactor over a prolonged period of time without any trouble at all being caused by the erosion and corrosion mentioned above.

The foregoing objects can be attained according to the present invention by a process for the hydrodesulfurization of heavy petroleum hydrocarbon oil which comprises bringing into contact the foregoing oil with a hydrogen-containing gas and a hydrodesulfurization catalyst in a fluidized state, characterized in that (a) Said heavy oil and hydrogen-containing gas are introduced into a reactor containing said catalyst,
(b) The reaction system consisting of the heavy oil, hydrogen-containing gas and said catalyst is introduced to a fluidization initiating zone located in the reactor at the bottom thereof to initiate the fluidization of the system,
(c) This fluidized reaction system is caused to move from said fluidization initiating zone into a next adjoining fluidized reaction zone disposed in the aforesaid reactors above the former zone and while being moved upwardly through the fluidized reaction zone the hydrodesulfurization of the heavy oil is substantially carried out,
(d) The hydrodesulfurized product overflowing from said fluidized reaction zone and the catalyst are caused to dwell in a separating zone disposed inside said reactor next above the fluidized reaction zone, to separate the hydrodesulfurized product, the catalyst and the hydrogen-containing gas from each other,
(e) The catalyst separated in said separating zone is caused to settle to a catalyst settling zone disposed inside said reactor externally of the aforesaid fluidized reaction zone, the upper part of which catalyst settling zone communicates with said separating zone and the bottom part with the fluidization initiating zone, and
(f) The hydrodesulfurized product is withdrawn from the aforesaid separating zone.

The process of the present invention can be readily and conveniently carried out by using the below-described apparatus; namely, a hydrodesulfurization reactor for heavy petroleum hydrocarbon oil, which comprises, in combination, a feed inlet for the heavy oil and hydrogen-containing gas, a fluidization initiating zone wherein the heavy oil and hydrogen-containing gas fed from said inlet are brought into contact with a hydrodesulfurization catalyst to initiate the fluidization of said catalyst, a fluidized reaction zone which while moving the aforesaid fluidized reaction system upwardly effects the hydrodesulfurization of the heavy oil, a separating zone wherein the hydrodesulfurized product overflowing from the fluidized reaction zone and the catalyst are caused to dwell and the hydrodesulfurized product, the catalyst and the hydrogen-containing gas are separated from each other, a hydrogen gas vent for discharging the separated hydrogen-containing gas, an outlet for withdrawing the separated hydrodesulfurized product from the separating zone, and a catalyst settling zone for settling the catalyst separated in the separating zone; said fluidization initiating zone provided with the feed inlet for the heavy oil and hydrogen-containing gas at its central bottom point, the bottom part of said zone being defined by the bottom of the reactor, which inclines centripetally and downwardly from the lower end of the peripheral wall of the reactor, said zone being in communication at its upper central part with the lower part of said fluidized reaction zone and at its upper circumferential part with the lower part of said catalyst settling zone via an annular choked passage, said separating zone being in communication at its lower central part with the upper part of said fluidized reaction zone and at its lower circumferential part with the upper part of said catalyst settling zone, and having a hydrogen-containing gas vent and a hydrodesulfurized product withdrawal outlet in its ceiling and upper side wall, respectively, the periphery of said fluidized reaction zone being defined by an inner pipe disposed vertically inside the reactor coaxially therewith, said catalyst settling zone being defined by the outer wall of the aforesaid inner pipe and the peripheral wall of the reactor.

For a better understanding of the present invention reference is had to the accompanying drawing which is a schematic sectional view of an embodiment of a reactor used in the present invention.

Referring to the drawing the feed stock heavy oil and hydrogen-containing gas pass through a feed inlet 2 and enter via a fluidization initiating zone 14 into a fluidized reaction zone 3 surrounded by the inner wall of a pipe 3. At 8 the catalyst is maintained in a fluidized state. That the catalyst is in a fluidized state, as here referred to, denotes a state in which the volume of the mass of catalyst particles increases by at least 2%, and preferably from 10 to 100% when the reactor is demonstrating its functions as a reactor, as compared to the volume of the catalyst particles when standing still. The catalyst is maintained in a fluidized state in the fluidized reaction zone 8. The superficial velocity of the oil and hydrogen-containing gas when passing the zone 8 must be sufficient for maintaining the catalyst particles in a fluidized state. The superficial velocity of the oil and hydrogen-containing gas necessary for maintaining a fluidized state in the fluidized reaction zone 8 varies depending upon the average particle size and particle size distribution of the catalyst, as well as the proportion in which the oil and hydrogen are fed but, generally speaking, a range of 0.2 to 20 centimeters per second is preferred.

The ctalyst particles rise in the fluidized reaction zone 8 while maintaining their fluidized state but since the rate of flow of the oil and gas decreases in the separating zone 10 with an increase in the sectional area, the catalyst whose specific gravity is greater than that of the oil is separated downwardly. The catalyst particles which have been settled in the separating zone 10 enter a catalyst settling zone 9 consisting of an annular passage formed by the inner wall 1 of the reactor and the outer wall of the inner pipe 3. The catalyst particles are packed more densely in the catalyst settling zone than in the fluidized reaction zone 8. The catalyst in the zone 9 moved downwardly at a slow pace and is delivered to the fluidization initiating zone 14 from the annular chocked passage 11. The catalyst is again fluidized here by means of the oil and gas and delivered into the fluidized reaction zone 8 to repeat its cycle. Since the packing density of the reaction zone 8 is less than that of the settling zone 9 and the pressure loss while the oil and gas pass through the zone 9 is greater than the pressure loss while they pass through the zone 9, the oil and gas which have been blown in from the inlet 2 rise by passing mainly through the zone 8, and in the meantime the hydrodesulfurization reaction is substantially carried out.

The reactor is preferably designed with the separating zone 10 disposed above the fluidized zone 8 and with a gas dwelling zone disposed above the former. Accordingly, it is preferred that the oil be withdrawn from the separating zone 10 via an outlet 5, while the hydrogen-containing gas is withdrawn from the gas swelling zone 13 via a vent 4.

The catalyst is charged or replenished via a catalyst charging inlet 6 opening into the catalyst settling zone 9 at a point thereabove, whereas the withdrawal of the catalyst is carried out by means of a catalyst withdrawal outlet 7 preferably provided at the lower part of the zone 9. The charging and replenishing of the catalyst and the withdrawal of the spent catalyst can either be carried out continuously or intermittently. Further, the charging and replenishing of the catalyst and the withdrawal of the spent catalyst can be carried out by the provision of a suitable number of inlets and outlets at suitable locations.

Since the charging, replenishment and withdrawal of the catalyst is carried out externally of the fluidized reaction zone according to the process of the present invention, the fluidized reaction zone is hardly affected at all by the charging, replenishment and withdrawal of the catalyst, and hence the fluidized reaction zone is maintained in a steady state. This results in the simplification of the operation in the case of a commercial apparatus which carries out the dehydrosulfurization process with the catalyst particles in a fluidized state. Thus, the invention process is a great improvement over the conventional processes.

In the present invention any petroleum oil containing asphaltenes and sulfur can be used as the heavy petroleum hydrocarbon stock. A convenient example of such a feed stock is the normal and reduced pressure distillation residual oil containing over 1 by weight of sulfur, which is generally referred to as heavy oil. It is, of course, apparent to those skilled in the art that the present invention can also be applied to the petroleum crude oil containing sulfur and asphaltenes.

The catalysts used in the invention process may be those which per se known as being hydrodesulfurization catalysts. For example, for the purpose of hydrodesulfurization a catalyst comprising alumina or silica-alumina on which has been supported one or more of the metals of Groups I, VI and VIII of the Periodic Table of Elements can be used. As such a catalyst, included are the sulfur-resistant catalyst such as the alumina or silica-alumina-supported nickel-molybdenum catalyst, nickel-cobalt-molybdenum catalyst, cobalt-molybdenum catalyst and nickel-tungsten catalyst.

The ranges of properties and configuration of the catalyst particles used in the invention process are very extensive. Spheroidal catalyst of particle size ranging 0.1 mm.–10 mm. and extrusion molded type catalyst as well as other solid catalysts of any configuration can be used, but particularly effective are the spheroidal catalysts and extrusion molded type catalysts of 0.1 to 2 mm. in diameter. Further, catalysts whose true specific gravity range 1.50–5.00 and apparent specific gravity range 0.30–1.50 can be used. This is because the separation of the oil, gas and catalyst in the separating zone 10 has been facilitated as a result of the great reduction of the superficial velocity of the oil and gas in the separating zone 10 as compared with that in the fluidized reaction zone; thus making it possible to use such catalysts which could not have been used in the conventional processes in which the separation of the oil, gas and catalyst was difficult. Generally speaking, in the hydrodesulfurization of oil, the treatment can be conducted more favorably, when the catalyst is to be used in a fluidized state, by cycling an oil which has been submitted at least once to the hydrodesulfurization process. However, if a catalyst of small particles is used, the amount of oil flow necessary for effecting the fluidization of the catalyst particles can suffice with a smaller amount. Consequently, the process can be performed by cycling a lesser amount of the oil which has been submitted to the hydrodesulfurization process at least once, or it can be carried out without using such an oil at all. As a result, the volume of the reactor can be made smaller than when catalyst of large particle sizes has been used, with the consequence that in commercial scale operations a great reduction is realized connection with the costs of construction of the apparatus as well as its operation.

Further, in the hydrodesulfurization process, generally the treatment can be carried out more favorably when the hydrogen introduced into the reactor is sufficiently in excess of the amount of hydrogen chemically consumed. Hence, it is more advantageous to recycle and reuse the unreacted hydrogen gas in the reactor. In this case also the amount of the hydrogen-containing gas introduced into the reactor for maintaining the fluidized state of the catalyst particles, as well as carrying out the desired hydrodesulfurization treatment to obtain the intended product will suffice with a lesser amount, hence contributing to a great decrease in the cost of construction and operation of the apparatus in the case of commercial scale operations.

According to the invention process, the place where the reaction is caused to be carried out is principally the fluidized reaction zone 8 and substantially no reaction takes place in the catalyst settling zone 9 and the separating zone 10. Therefore, the catalyst that comes into contact with the hydrogen and the oil which receives the hydrodesulfurizing treatment is only a part of the catalyst. On the other hand, since the catalyst particles are cycled through the reactor in the sequences of zones 8, 10, 9 and 14, the catalyst particles whose contact with the oil and hydrogen has been completed have substantially no contact thereafter for certain length of time. Hence, as compared with those cases where the catalyst is in constant contact with the feed stock oil, which contaminates the catalyst, the rate of contamination of the catalyst is slower and hence the decline in activity of the catalyst in the reactor is slower. Consequently, this process is technically and economically a great advantage since the frequency of exchanging the catalyst becomes less in those cases where the catalyst is to be exchanged at prescribed intervals. Again, when the catalyst is exchanged continuously, the amount required becomes less.

In practicing the process of the present invention, the fluidization reaction zone is most desirably of cylindrical shape and the cross-section of the reactor is also preferably circular. In this case, the separating zone 10 is of cylindrical shape of still greater diameter, and the catalyst settling zone 9 is annular and being coaxial with the fluidized reaction zone encloses the latter. In this case, for maintaining the catalyst particles in a fluidized state, the superficial velocity of the oil and hydrogen-containing gas passing through the fluidized reaction zone 8 must be one which is at least a certain level or more, and for ensuring the maintenance of the catalyst particles having the previously indicated properties and configuration in a fluidized state in the zone 8 and to effect their prompt settling in the separating zone 10, it is preferred that following relationship holds between the outer diameter $d$ of the inner pipe 3 and the inner diameter $D$ of the outer case, i.e. the reactor peripheral wall 1.

(1)
$$D - d \geq 3 \text{ cm.}$$
$$D/d \leq 2.5$$

When this relationship holds, the catalyst particles become separated from the oil and hydrogen-containing gas and enter the settling zone 9. The catalyst particles accumulated in the zone 9 pass through the narrow opening, i.e. the chopped passage 11, between the inner pipe and then outer casing by means of gravity and move into the fluidized reaction zone 8. For ensuring that this movement is effectively carried out, it is preferred that the distance $b$ of this narrow opening, i.e. the passage 11, is a value $\frac{1}{200}$–$\frac{1}{5}$ of the inner diameter $D$ of the outer casing.

(2)
$$b = \frac{D}{200} \sim \frac{D}{5}$$

In addition, the lower part 15 of the outer casing must be inclined. This lower part 15 may be either straight or curved, but when it is curved, its radius of curvature $R$ should preferably be greater than $D/4$.

(3)
$$R > \frac{D}{4}$$

On the other hand, regardless of whether the inclined surface 15 is straight or curved, the preferred relationship between the height $f$, the height from the opening of said feed inlet to outermost end of said inclined bottom, and the height $e$, the distance of the inner pipe from said opening, is as follows:

(4)
$$f \geq e/40$$

In addition, it is preferred that when the inclined surface 15 is straight, its inclination $\theta$, or when the inclined surface is curved, the inclination $\theta$ of a tangent line drawn at its lowest point satisfies the following relationship:

(5)
$$10° < \theta < 70°$$

The configuration of the fluidized reaction zone can be freely chosen, but it is preferred that the relationship between its diameter $d$ and its length $l$ satisfies the following relationship:

(6)
$$1.2 < l < d < 50$$

In the reactor used in the present invention the catalyst in a fluidized state makes contact with the heavy petroleum hydrocarbon oil and the hydrogen-containing gas in the fluidized reaction zone 8. Hence, of the elements making up the reactor the inner pipe 3 is the only one requiring consideration as being subjected to the harsh erosive and corrosive conditions involved. However, since the pressure to which the inner and outer surfaces of the inner pipe 3 is subjected is equal, its thickness may be thinner than that of the outer casing. Hence, it is less costly than the outer casing, thus making exchange of the inner pipe alone a simple matter economically. That is to say, in the case of the apparatus according to the present invention, the outer casing which must withstand the reaction pressure does not become eroded and erosion-corroded easily, whereas in the case of inner pipe which is subjected to harsh erosive and erosion-corrosive conditions, no consideration need to be given to its strength for resisting the reaction pressure and moreover its replacement is also economically feasible.

The reaction conditions employed differ depending upon the properties of the feed stock oil, and the properties desired in the product. Generally speaking, the aforesaid heavy oil and hydrogen-containing gas are contacted with the hydrodesulfurization catalyst inside the reactor at a temperature of 200 to 500° C., preferably 300 to 450° C., and a pressure of 10 to 400 kg./cm.$^2$ gauge, preferably 100 to 300 kg./cm.$^2$ gauge. In this case it is preferred to maintain the liquid hourly space velocity (LHSV) of the heavy oil at 0.2 to 5.0 vol./vol./hr., preferably 0.5 to 3.0 vol./vol./hr., and the ratio of the flow rates of hydrogen to feed stock oil at 50 to 1,000 l.-NTP/l. of feed stock oil.

The hydrodesulfurized oil which has left the reactor is submitted to either steam stripping, reduced pressure steam stripping, or reduced or normal pressure distillation, or a combination of these treatments to remove the dissolved gas and separate the low boiling components such as cracked light oils.

While the presents invention has been described hereinbefore on the basis of the accompanying drawing, it should be apparent that numerous modifications are possible. For instance, the invention process can be practiced with two or more of the hereinbefore described reactors connected in parallel or series.

The advantages to be had by practicing the present invention are as follows:

(1) A fluidized state of the catalyst particles can be maintained in the fluidized reaction zone, using a wide range of catalyst particles including spheroidal catalysts of particle diameters 0.1 mm.–10 mm. and extrusion molded catalysts as well as other catalysts of all types of configuration whose true specific gravities range 1.50–5.00, and the separation of the catalyst particles from the oil and gas can be accomplished readily in the separating zone.

(2) Fine catalyst particles can be used, thus making it possible to reduce the amount cycled of the oil and gas for fluidizing the catalyst particles. Hence, the costs required for the construction and operation of the apparatus can be reduced.

(3) In the case of the reactor used in the present invention, the catalyst that makes contact with the feed stock oil is only a part of the catalyst present in the reactor. Consequently, as compared with the type wherein all the catalyst in the reactor is in contact with the feed stock oil, the rate of degradation of the catalyst is slower, thus making the frequency of exchange of the catalysts less.

(4) In the reactor used in the present invention the part requiring pressure-resistant strength is not liable to erosive and erosion-corrosive actions and, on the other hand, that part which are subject to harsh conditions of erosion and erosion-corrosion does not require pressure-resistant strength. Thus, since the latter part alone can be replaced, it is economical.

For further illustration of the present invention, the following examples are given.

EXAMPLES

A reactor of the type shown in the drawing was employed, and a hydrodesulfurization reaction was carried using the feed stock oil, catalyst, reaction conditions and reactor as indicater as indicated in Table I, with the result that a product having the properties shown in the same Table I was obtained.

The separation of the oil, hydrogen-containing gas and catalyst particles was accomplished very satisfactorily. Further, the replacement of the catalyst was carried out at intervals of about 15 hours, with no disruption of the steady state nor changes in the properties of the product. Again, there were noted little, if any, erosion and erosion-corrosion of the inner wall of the outer casing of the reactor.

TABLE I

|  | Example 1 | | Example 2 | | Example 3 | |
| --- | --- | --- | --- | --- | --- | --- |
|  | Feed stock oil [1] | Product | Feed stock oil | Product | Feed stock oil | Product |
| Properties of oil: | | | | | | |
| Class of feed stock | ([1]) | | ([2]) | | ([1]) | |
| Total sulfur (weight percent) | 4.25 | 1.20 | 3.97 | 0.80 | 4.25 | 0.77 |
| Desulfurization rate (percent) | | 78.9 | | 80 | | 89 |
| Residual carbon (weight percent) | 13.1 | 10.31 | 9.8 | 7.2 | 13.1 | 10.3 |
| Yield based on feed stock | | 95.2 | | 93.2 | | 90.2 |
| Viscosity (c.st at 50° C.) | 1,075 | 775.3 | 351.2 | 245 | 1,075 | 79.1 |
| Catalyst: | | | | | | |
| Class of catalyst | ([3]) | | ([4]) | | ([5]) | |
| Configuration of particles, mm. spheroid | 0.3 | | ([6]) | | 0.15 | |
| True specific gravity | 3.00 | | 3.3 | | 3.2 | |
| Reaction conditions: | | | | | | |
| Temperature, ° C | 400 | | 410 | | 390 | |
| Pressure, kg./cm.² a | 270 | | 200 | | 170 | |
| LHSV (l./hr.) | 1.0 | | 1.0 | | 0.8 | |
| Continuous operation time, hours | 93 | | 200 | | 200 | |
| Amount of oil cycled, (m.³)/feed oil (m.³) | 5.0 | | 8.8 | | 7.0 | |
| Amount of hydrogen cycled, m.³/feed oil (m.³) | 830 | | 1,020 | | 250 | |
| Dimensions of reactor: | | | | | | |
| D, cm | 10 | | 20 | | 10 | |
| d, cm | 7 | | 15 | | 5 | |
| L, cm | 100 | | 400 | | 200 | |
| l, cm | 70 | | 330 | | 150 | |
| f, cm | 5 | | 20 | | 10 | |
| b, cm | 1 | | 2 | | 0.7 | |

[1] Khafji oil normal pressure distillation residue.
[2] Khurusanya oil normal pressure distillation residue.
[3] Silica-alumina supported Co-Mo type catalyst.
[4] Silica-alumina supported Ni-Co-Mo type catalyst.
[5] Alumina supported Ni-Mo type catalyst.
[6] Extrusion molded article having a diameter of 0.55 mm.

We claim:

1. A process for the hydrodesulfurization of a heavy petroleum hydrocarbon oil which comprises:
   (a) Passing said oil with a hydrodesulfurization catalyst and a hydrogen-containing gas into a fluidization initiating zone of a hydrodesulfurization reactor wherein the fluidization of the catalyst is initiated;
   (b) Passing a mixture of said fluidized catalyst and oil upwardly through a fluidized reaction zone centrally located within said reactor;
   (c) Passing said mixture from said reaction zone into a separating zone of increased cross-sectional area as compared with the cross-sectional area of said fluidized reaction zone;
   (d) Withdrawing said oil from the top of said separating zone and allowing substantially all of said catalyst without accompanying flow of said oil to separate downwardly from said separating zone into a catalyst settling zone due to the increase in the cross-sectional area of the separating zone and the resulting decrease in the flow rate of said oil and gas, said separating zone being defined by the wall of said reactor and being in communication at its lower peripheral part with the upper part of said catalyst settling zone; and
   (e) Returning the catalyst from said catalyst settling zone to said fluidization initiating zone to repeat steps (a) through (d).

2. The process according to claim 1 wherein the superficial velocity of said heavy oil and hydrogen-containing gas in said fluidized reaction zone is maintained in the range from 0.2 to 20 centimeters per second.

3. The process according to claim 1 wherein said catalyst is a solid catalyst whose particle diameter is 0.1–10 mm., true specific gravity is 1.50–5.00 and apparent specific gravity is 0.30–1.50.

4. The process according to claim 1 wherein the temperature of said fluidized reaction zone is maintained at 200 to 500° C., and the pressure at 10 to 400 kg./cm.² gauge.

5. The process according to claim 1 wherein said heavy oil is fed at a liquid hourly space velocity in the range from 0.2 to 5.0 vol./vol./hr.

6. The process according to claim 1 wherein the ratio of feed of the hydroegn to the feed stock oil is maintained at 50 to 1000 l.-NTP/l. of feed stock oil.

References Cited

UNITED STATES PATENTS

| 3,124,518 | 3/1964 | Guzman et al. | 208—213 |
| 2,386,681 | 10/1945 | Hadden | 260—683.52 |
| 2,747,003 | 5/1956 | Kilpatrick | 260—683.53 |
| 2,930,748 | 3/1960 | Montgomery et al. | 208—213 |
| 3,271,301 | 9/1966 | Galbreath | 208—216 |
| 3,368,965 | 2/1968 | Schuman | 208—216 |

FOREIGN PATENTS

| 508,926 | 2/1952 | Belgium | 208—216 |

DELBERT E. GANTZ, Primary Examiner

G. J. CRASANAKIS, Assistant Examiner

U.S. Cl. X.R.

23—288